(12) United States Patent
Eckert et al.

(10) Patent No.: US 6,631,923 B2
(45) Date of Patent: Oct. 14, 2003

(54) AIRBAG AND METHOD OF FORMING THE SAME

(75) Inventors: Nick Eckert, Berlin (DE); Carsten Rietz, Berlin (DE); Ingo Müller, Wernsdorf (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/919,597

(22) Filed: Aug. 1, 2001

(65) Prior Publication Data
US 2002/0020996 A1 Feb. 21, 2002

(30) Foreign Application Priority Data
Aug. 7, 2000 (DE) .......................... 100 39 555

(51) Int. Cl.[7] .............................................. B60R 21/16
(52) U.S. Cl. ................... 280/743.1; 280/730.1
(58) Field of Search ............................ 280/743.1, 728.1, 280/733, 743.2, 730.1

(56) References Cited

U.S. PATENT DOCUMENTS

| | | | |
|---|---|---|---|
| 3,830,519 A | * | 8/1974 | Lewis .......................... 280/733 |
| 3,841,654 A | * | 10/1974 | Lewis .......................... 280/733 |
| 3,866,940 A | * | 2/1975 | Lewis .......................... 280/733 |
| 3,970,329 A | * | 7/1976 | Lewis .......................... 280/733 |
| 4,944,529 A | | 7/1990 | Backhaus |
| 5,087,071 A | | 2/1992 | Wallner et al. |
| 5,324,070 A | | 6/1994 | Kitagawa et al. |
| 5,492,073 A | | 2/1996 | Abraham |
| 5,797,620 A | | 8/1998 | Eyrainer |
| 6,039,380 A | | 3/2000 | Heilig et al. |
| 6,142,511 A | * | 11/2000 | Lewis .......................... 280/733 |
| 6,155,595 A | | 12/2000 | Schultz |
| 6,189,921 B1 | * | 2/2001 | Takeuchi ..................... 280/733 |

FOREIGN PATENT DOCUMENTS

| | | |
|---|---|---|
| DE | 41 25 530 C1 | 2/1992 |
| DE | 43 01 906 A1 | 8/1993 |
| DE | 35 44 248 C1 | 8/1994 |
| DE | 43 02 904 A1 | 8/1994 |
| DE | 295 1 953 U1 | 12/1995 |
| DE | 195 21 723 A1 | 12/1995 |
| DE | 297 10 745 U1 | 11/1997 |
| DE | 298 07 424 U1 | 10/1998 |
| WO | WO 97/44215 | 11/1997 |

* cited by examiner

Primary Examiner—Paul N. Dickson
Assistant Examiner—Ruth Ilan
(74) Attorney, Agent, or Firm—Foley & Lardner

(57) ABSTRACT

An airbag, particularly for the knee or head region of a vehicle occupant, has a substantially cylindrical main region. The airbag comprises a substantially cylindrical fabric tube whose lateral ends are stitched after folding the tube into a predetermined pattern having at least two looped segments. The fabric tube can be formed by joining the lateral edge of a rectangular fabric blank.

17 Claims, 7 Drawing Sheets

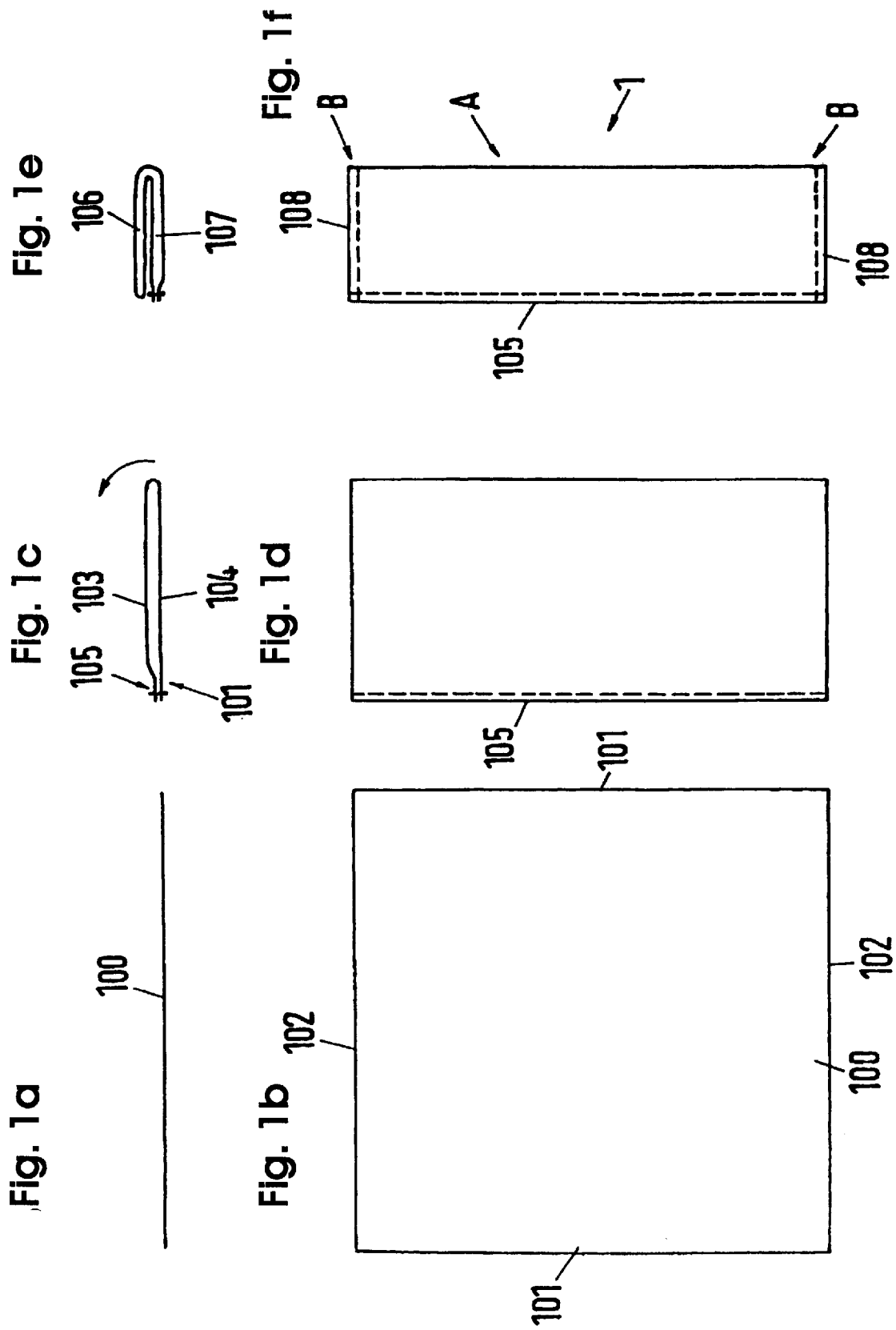

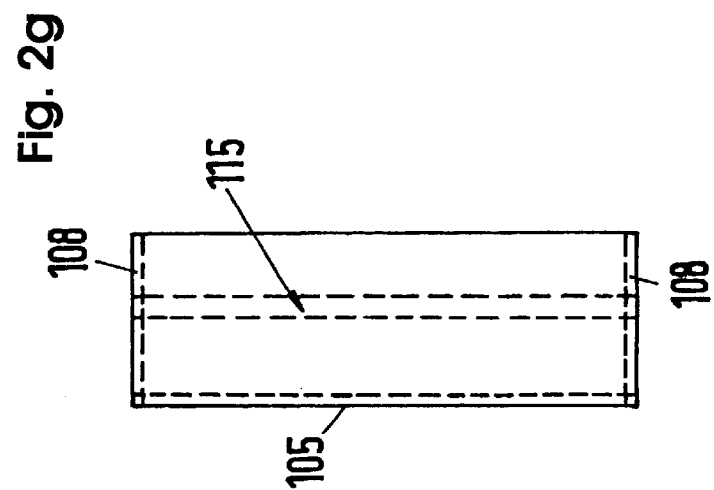
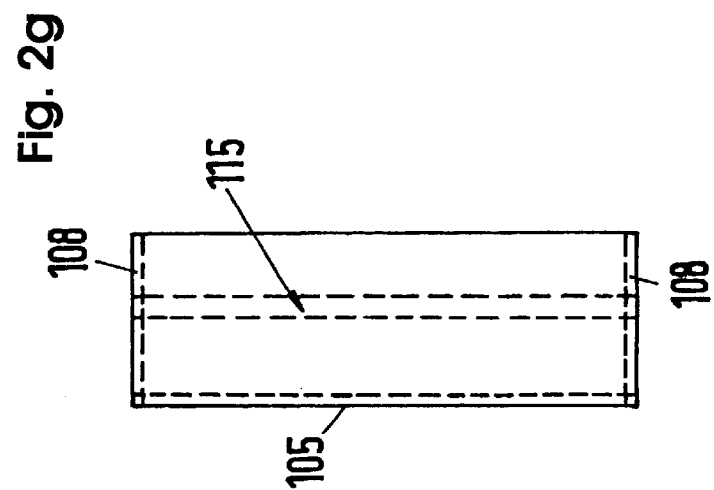

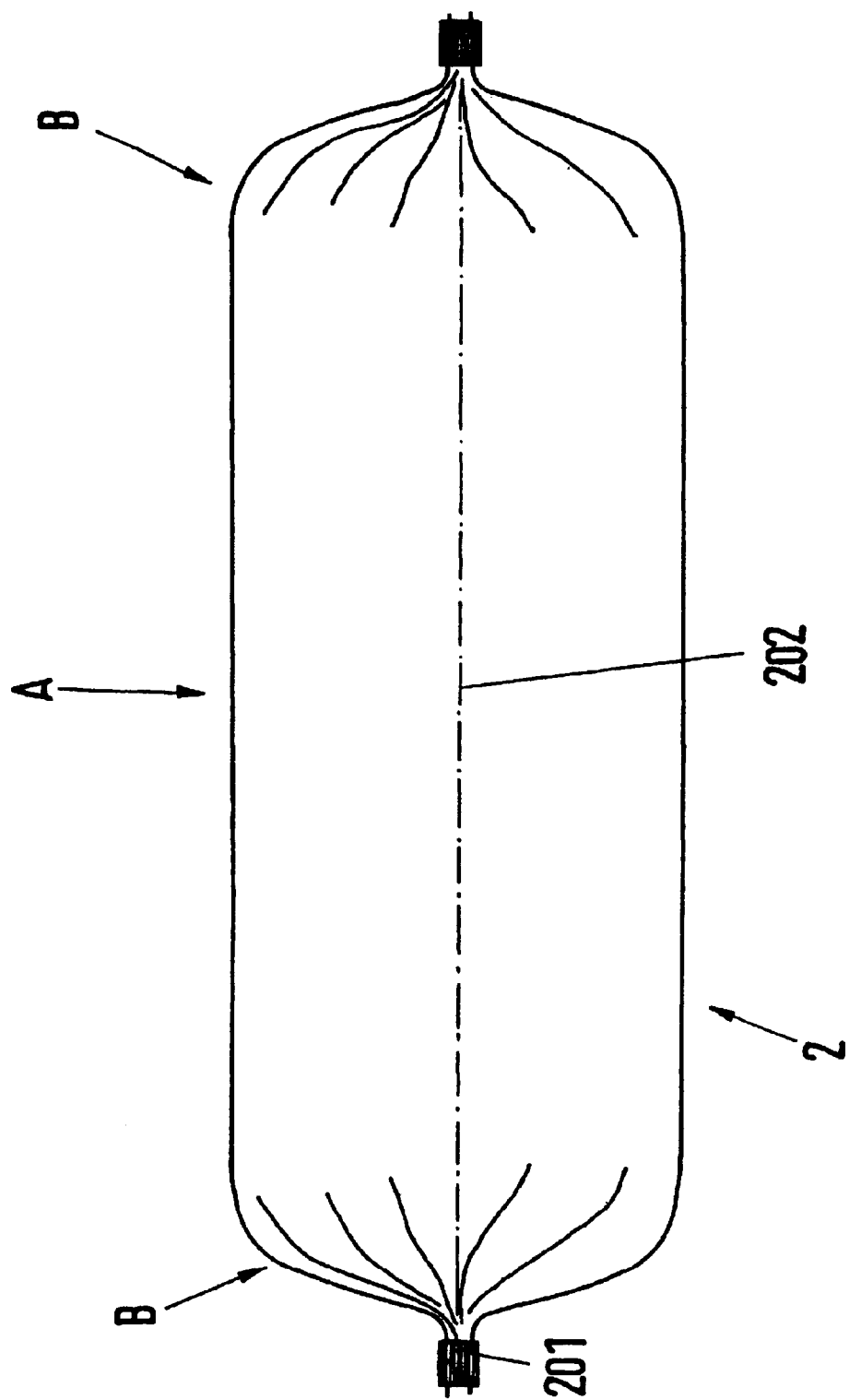

AIRBAG AND METHOD OF FORMING THE SAME

BACKGROUND

Airbags can be used to protect a vehicle occupant during a collision or rollover. Airbags can also be configured to protect specific body components. In this respect, vehicles can be provided with airbags for protecting the occupant's knee region. Airbags for the knee region (i.e., knee airbags) must absorb relatively high impact energy over a relatively small area within a relatively short displacement. To reliably protect the vehicle occupant's knee or lower leg, it is necessary for the knee airbag to deploy quickly with a high restraining force.

German patent publication DE 297 10 745 U1 discloses a knee-restraining device having an airbag and a knee catcher plate. The airbag propels the knee catcher toward the occupant's knee during a collision. Catching straps are needed to fix the end position of the knee catcher plate and to control the path of movement of the knee catcher plate during its deployment. The knee catcher plate advantageously distributes the impact force over a relatively large area so that a higher restraining force can be implemented with a relatively low airbag internal pressure. The knee catcher plate, however, results in a more complicated and costly protection system.

German patent publication DE 298 07 424 U1 also discloses a knee protection device with an airbag configured as a cushion. To apply a high restraining force, the airbag has catching straps that connect opposite portions of the airbag wall, and thus counteract the shape change of the airbag when the knee penetrates it. In addition, the airbag needs partitions that form a plurality of chambers inside the airbag. The catching straps and the airbag partitions likewise involves a more complicated and costly protection system. Moreover, the cushion-shaped airbag creates an unfavorable stress distribution at a relatively high airbag pressure that stresses the seam region. Furthermore, the cushion-shaped airbag blank impairs the restraining action in the edge region due to its decreased depth.

German patent publication DE 295 17 953 U1 also discloses a knee protection device with a cylindrical airbag that is fastened, laced together at its lateral ends to the vehicle. It is therefore not possible to attach the airbag in a vehicle without a lateral fastening means.

Accordingly, there still remains a need to improve an airbag, in particular, for protecting the lower leg portion, including the knee, and a head. The present invention addresses this need.

SUMMARY OF THE INVENTION

The present invention relates to an airbag and a method of forming the airbag. The airbag is particularly useful as a head airbag or knee airbag.

The airbag comprises a substantially cylindrical tube folded longitudinally to form a predetermined fold pattern having at least two individual looped segments and a lateral seam that closes each lateral end thereof. The laterals seams maintain the fold pattern. The airbag in the inflated states is substantially cylindrical. The resulting airbag can have relatively short lateral end regions to maximize the cylindrical extent of the inflated airbag. The cylindrical tube can comprise a rectangular fabric layer with a longitudinal seam that joins longitudinal ends thereof.

The predetermined fold pattern includes a half fold, where the cylindrical tube is folded in half longitudinally to form two looped segments. It also includes at least four individually looped segments grouped into two sections having at least two adjacent segments laid one upon another, with the lateral seams maintaining the grouping. In this respect, the airbag can have six looped segments, three to each section. The fold pattern can also include a middle region from the segments can extend outwardly. The middle region can have a clearance.

In another embodiment, the segments overlap one another at least partially in a middle region from which the segments extend outwardly. The overlapping segments can be arranged one above the other in the middle region.

The airbag can further include additional fabric portions inserted at the lateral ends of the airbag between or into the individual segments of the folded airbag, and secured with the lateral seams. The additional fabric portions can be integrally formed with the tube. The additional fabric portions can also comprise double-folded cloth strips pushed from the side between or into the segments before the lateral seams are formed. The additional fabric portions can be inserted into regions of the folded tube having a reduced number of layers arranged one above the other to compensate for varying thicknesses caused by different number of layers.

The longitudinal and lateral seams can be stitches. The region of the fabric layers where the longitudinal seam is formed can have a substantially constant thickness.

The method of forming an airbag comprises providing a substantially cylindrical tube, folding the tube longitudinally to form a fold pattern having at least two individual segments, and closing each lateral end of the tube with a lateral seam, which also maintains the fold pattern.

The tube can be formed by joining together longitudinal ends of a rectangular fabric layer with a seam, such as by folding the rectangular fabric layer in half to align the longitudinal ends.

The folding step can comprise folding the cylindrical tube in half longitudinally to form two individual segments. The folding step can comprise forming at least four individually looped segments and grouping the segments into two sections by situating at least two adjacent segments one next to another. The folding step includes forming six looped segments and grouping the segments three to each section. The folding step can further include forming a middle region from which the segments can extend outwardly, with a clearance. The folding step can include overlapping segments one another at least partially in the middle region from which the segments extend outwardly, with the overlapping segments arranged one above the other in the middle region.

Additional fabric portions can be inserted at the lateral ends of the airbag between or into the individual segments, and secured the fabric portions with the lateral seams.

The other airbag features described above can also be incorporated in the present method.

BRIEF DESCRIPTION OF THE DRAWINGS

FIGS. 1a–1f show the production and formation of a first embodiment of an airbag according to the present invention.

FIGS. 2a–2g show the production and formation of a second embodiment of an airbag according to the present invention.

FIG. 4 shows a fourth embodiment of an airbag according to the present invention.

DETAILED DESCRIPTION

Figure 3A:
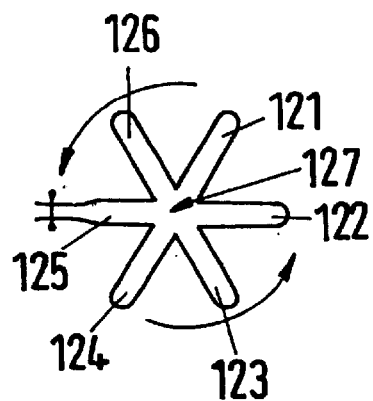
FIGS. 3a–3c show the production and formation of a third embodiment of an airbag according to the present invention.

FIGS. 1a–1f show the sequence for producing a first exemplary embodiment of an airbag 1 according to the present invention. The airbag 1 comprises a single-piece rectangular fabric sheet 100 with opposing longitudinal sides 101 and opposing transverse or lateral sides 102, as shown in FIG. 1b, which shows the top elevational view of the fabric sheet 100. FIG. 1a shows the side view of the fabric sheet 100. The fabric sheet 100 is first folded together along the transverse sides to half its width so that two fabric layers 103, 104 are formed, as illustrated in FIG. 1c. The two layers 103, 104 constitute longitudinal portions of the fabric sheet 100. The fabric sheets 103, 104 are joined together or closed along their longitudinal sides 101 with a longitudinal seam 105, as illustrated in FIG. 1d. Alternatively, the longitudinal edges 101 can be aligned and joined with the seam 105. The seams can be formed by stitching or sewing. This essentially forms a cylindrical fabric tube.

Next, the dual layered fabric sheet 100 or the tube can be folded in half longitudinally, i.e., along the transverse sides 102 to half its width, so that two dual-layered looped segments 106, 107 are formed, as illustrated in FIG. 1e. These two segments, which now has four fabric layers, are connected together along the transverse sides 102 to form opposing transverse or lateral seams 108, as illustrated in FIG. 1f. Alternatively, the transverse seams 108 can be formed together with the longitudinal seam 105.

The middle main region A of the airbag 1 becomes substantially cylindrical with a substantially constant cross section when it is inflated. The circumference of the cylindrical airbag 1 is in this region A is identical to the length of the transverse sides 102 of the fabric sheet 100. The cylindrical main region A is closed off in the lateral regions B by the transverse seams 108.

FIGS. 2a–2g show the sequence for producing a second exemplary embodiment of an airbag 1. FIGS. 2a–2d illustrate the sequence of forming a dual layered fabric sheet 100, which sequence is identical to that illustrated in FIGS. 1a–1d and previously described. After the longitudinal seam 105 is formed, the fabric sheet is then folded to a star configuration. As illustrated in FIG. 2e, four longitudinally and radially extending looped segments 111, 112, 113, 114 of substantially the same depth are formed. These segments extend from a middle region 115 so that the individual segments 111, 112, 113, 114 have a clearance relative to one another and only the uppermost and lowermost layers rest against one another.

Next, these four segments are then folded so that two groups or sections are formed, each with a pair of adjacent segments arranged horizontally as shown in FIG. 2f. As illustrated in FIG. 2f, the upper segment 111 is laid onto the left segment 114 and the lower segment 113 is laid onto the right segment 112 so that four fabric plies are arranged one above the other. Then, once again, transverse seams 108 are formed at the lateral ends, as illustrated in FIG. 2g.

Again, as in the embodiment of FIG. 1f, the middle main region of the airbag 1 becomes substantially cylindrical, with the cylindrical main region A closed off in the lateral regions B with the transverse seams 108. As compared with the embodiment of FIG. 1f, the embodiment of FIG. 2g is more advantageous in that, in the deployed state, the longitudinal extent of the lateral regions of the airbag becomes further reduced.

Figure 3B:
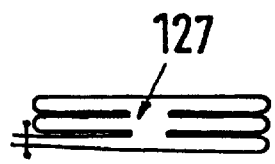
Figure 3C:
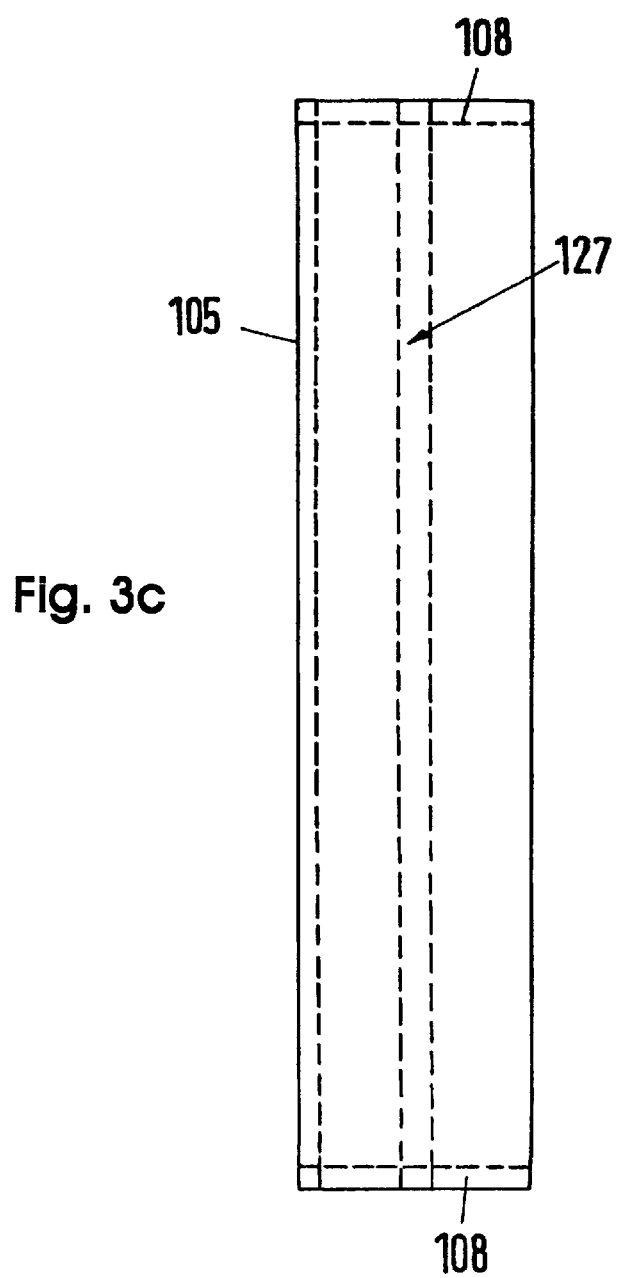

FIGS. 3a–3c show another embodiment of an airbag 1 according to the present invention. This embodiment is substantially similar to the embodiment of FIG. 2g. The only difference is that, the third embodiment has six looped star segments 121, 122, 123, 124, 125, and 126 rather than four looped star segments, as illustrated in FIG. 3a. The two upper segments 121, 126 are then laid onto the left segment 125 and the two lower segments 123, 124 onto the right segment 122. Then, six fabric layers come to rest one above the other, as illustrated in FIG. 3b. Again, a middle region 127 is provided, via which the individual segments extend therefrom. After the segments have been folded and laid one on another, as explained before with the second embodiment, transverse seams 108 are formed to form the airbag 1.

It should be noted that the airbag 1 can have any feasible number of star segments, such as 8, 10, etc. Moreover, instead of a rectangular sheet, the present airbag 1 can be also formed from a preformed seamed or seamless cylindrical fabric tube.

Figure 6:
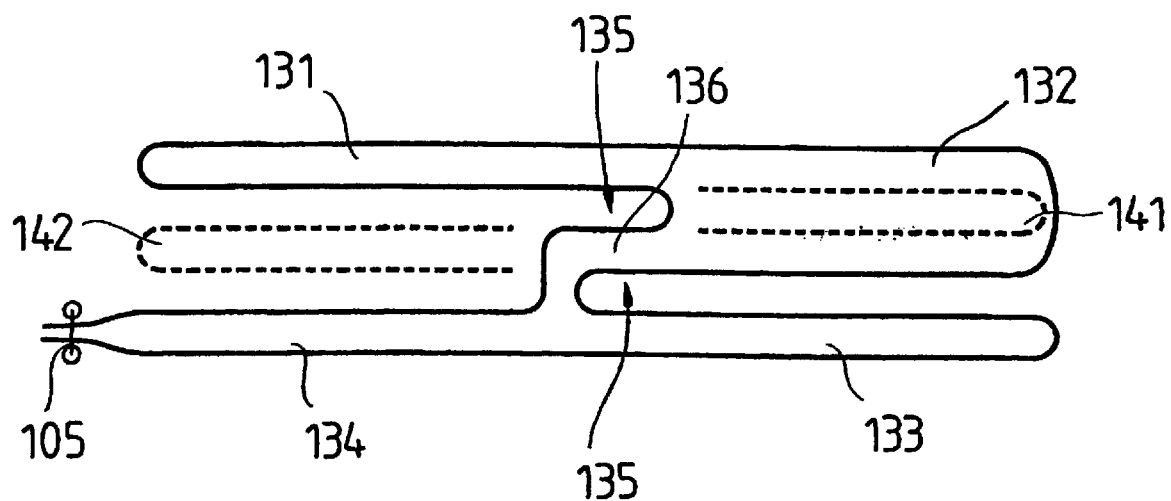
FIG. 6 shows a fifth embodiment of an airbag according to the present invention.

FIG. 6 illustrates yet another embodiment of an airbag according to the present invention. The production of the airbag can begin as illustrated and described with the embodiment, namely FIGS. 2a–2d. After the longitudinal seam 105 is formed, the tubular fabric thus formed is folded to obtain four eccentric looped segments 131, 132, 133, 134, which overlap one another in their (upper and lower) middle regions 135. Between the upper and lower middle regions, a connecting region 136 is formed, which connects the lower loops 133, 134 to the upper loops 131, 132. As a result, six fabric layers lie one above the other in the middle region 135.

The advantage of this configuration over the embodiments of FIGS. 2g and 3c is that in the middle region there is no interspace in which only the lowermost and the uppermost fabric layers are opposite one another. When only the lowermost and the uppermost fabric plies are opposite one another, the folded airbag has an uneven height since, in the adjoining region, a larger number of fabric layers (four layers in the embodiment of FIG. 2f and six layers in the embodiment of FIG. 3c) lie one above the other. This leads to problems in sealing and to undesirable stresses during the deployment of the airbag. This configuration avoids the situation where a cavity forms in the middle region of the folded airbag between the uppermost and the lowermost fabric layers, which may stress the airbag during its deployment. These disadvantages are avoided in the embodiment of FIG. 6 by virtue of the mutually overlapping segments; the middle regions 135 are provided with fabric plies lying one above the other.

Figure 7:
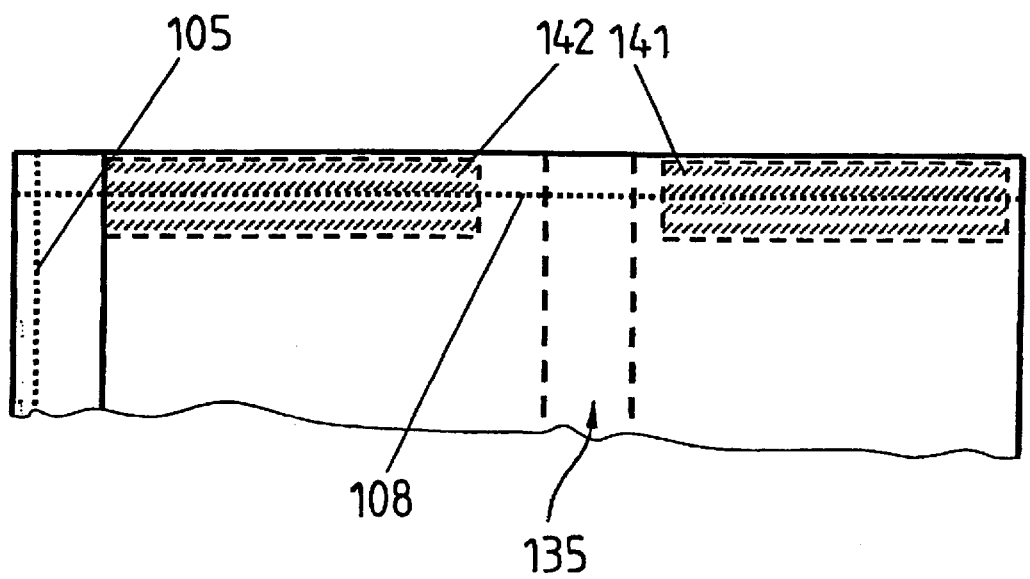
FIG. 7 shows a top view of an edge portion of the airbag of FIG. 6.

Referring to FIGS. 6 and 7, it is desirable to compensate for the different fabric layers, particularly in the seam region 108, to ensure that the folded airbag has a substantially constant thickness. This would not be afforded in the exemplary embodiment of FIG. 6, since six fabric plies are arranged one above the other in the middle region 135, while only four fabric plies are arranged one above the other in the adjoining region. For thickness compensation, before the transverse seam 108 is formed on the four-layered side, additional fabric portions or compensating plies can be arranged in the airbag, between or into the segments having a reduced number of layers, to provide an even height of the folded airbag. These additional cloth plies can be inserted, particularly in the lateral seam region adjoining the middle region 135, into or between the individual fabric layers of the looped segments and are stitched together with the transverse seam 108. These additional cloth plies can be, for example, double-folded cloth strips inserted from the side into and between the fabric plies of the segments 131, 134, 132.

FIGS. 6 and 7 illustrate (in phantom) two such double-folded cloth strips 141, 142. They bring about compensation between the increased number of fabric plies in the middle region 135 and the smaller number of fabric plies in the adjoining region. At the same time, it can be seen from the top view of FIG. 7 that the fabric portions 141, 142 are introduced into the airbag in the region of the transverse seam 108. The resulting uniform thickness of the edge region makes it possible to have better lateral stitching and sealing effect of the airbag. The transverse seam 108 has an improved seam strength, since there is a reduced region of attack by hot gases in the seam region.

Depending on the type of folding of the airbag, more than two cloth plies may also be provided in the region of the loop-like segments. The fabric tube may also be folded with six loops (according to the embodiment of FIG. 3c) or even more loops, in such a way that the loop-like segments overlap one another at least partially in their middle region and the fabric plies of the mutually overlapping segments lie one on the other in this region. Then, if appropriate, a correspondingly larger number of additional fabric portions can be provided.

Figure 8:
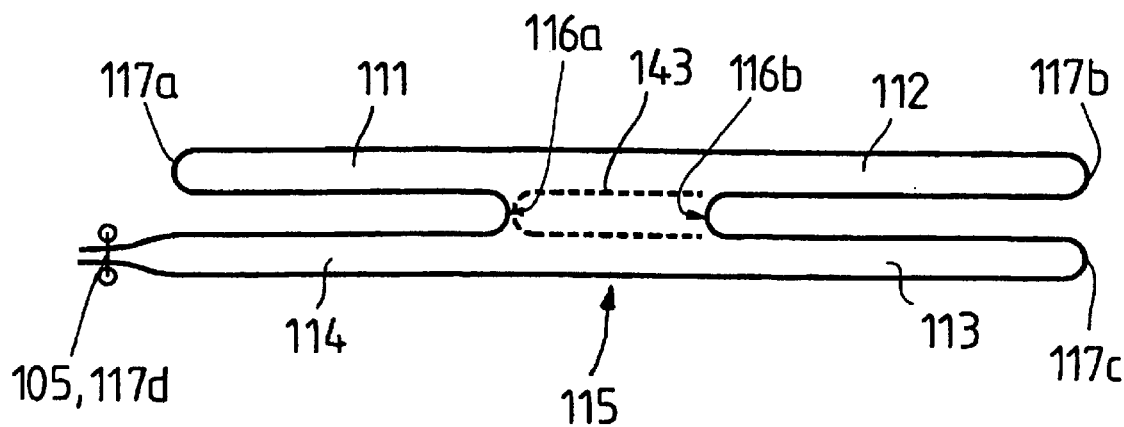
FIG. 8 shows an airbag corresponding to that of FIG. 2g, but with thickness compensation in the middle region.

FIG. 8 shows another embodiment of an airbag according to the present invention, which is substantially similar to the embodiment of FIG. 2g. Here, the difference is that the middle region 115, in which the individual segments 111, 112, 113, 114 have a clearance relative to one another, is made wider. The middle region 115 can also be defined by the distance between inner folding lines 116a, 116b of the segments 111, 112, 113, 114. The inner folding lines 116a, 116b are created by the folding of the fabric tube in forming a star configuration, as illustrated in FIG. 2e. They represent the transition between segments 114, 111 and 112, 113. Also, the segments 111, 112, 113, 114 each form at their our edge an outer folding line 117a, 117b, 117c, 117d, with one of the outer folding lines 117d being formed by longitudinal seam 105. Inner and outer folding lines naturally are also present in the embodiments of FIGS. 2, 3 and 6.

In the region 115, an additional fabric portion 143 (illustrated in phantom) can be provided in the region of the transverse seams 108. The fabric portion 143 can be, for example, a double-folded cloth serving for thickness compensation in the region of the transverse seams 108, as was explained with reference to the embodiments of FIGS. 6 and 7.

Figure 9:
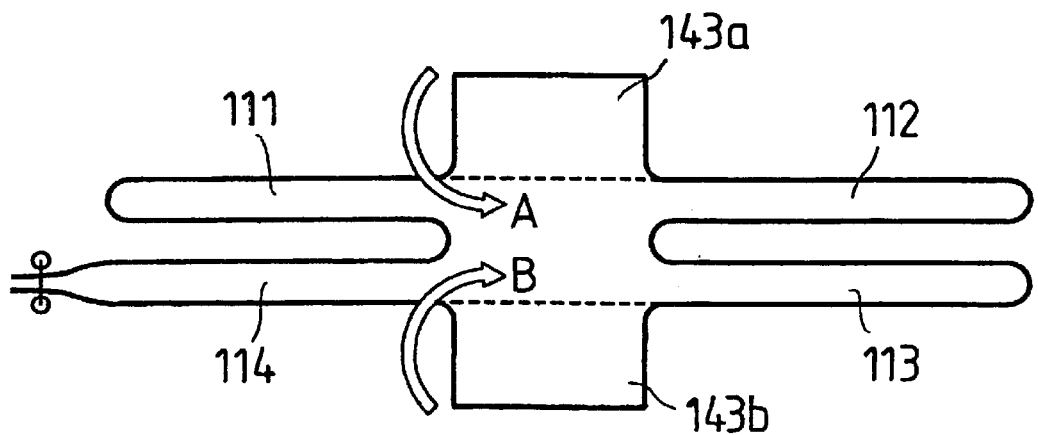
FIG. 9 shows the integration of additional fabric plies into the airbag of FIG. 8.

FIG. 9 shows an embodiment of an airbag according to the present invention, which is substantially similar in construction to the embodiment of FIG. 8. Here, the additional fabric portion 143 comprises fabric tabs 143a, 143b, which are part of the airbag and are integrated into the airbag blank. The fabric tabs 143a, 143b are in this case illustrated as projecting upward and downward respectively merely for the sake of clearer illustration. Before the transverse seam 108 is formed, the fabric tabs 143a, 143b are folded inward, as indicated by the arrows A, B. The fabric tabs 143a, 143b can be formed, for example, on the transverse sides 102 of a fabric sheet 100 illustrated in FIGS. 1b and 2b.

It should be noted that the formation of the additional fabric portions 143a, 143b as an integral part of the airbag blank can also be implemented in the exemplary embodiments of FIGS. 6 and 7.

FIG. 4 illustrates an alternative exemplary embodiment of an airbag according to the present invention, which has a cylindrical shape in a main region A. The lateral regions B are formed, in this embodiment, by gathering together the ends of the cylindrical region A in the direction of the longitudinal axis 202 of the airbag 2, and are subsequently closed, for example, with clamping elements 201. The cylindrical main region A may in this case be produced, according to FIGS. 1a–1d, from a rectangular fabric blank, with the longitudinal sides connected together to form a longitudinal seam, or from a prefabricated fabric tube woven as a single tubular member.

Figure 5A:
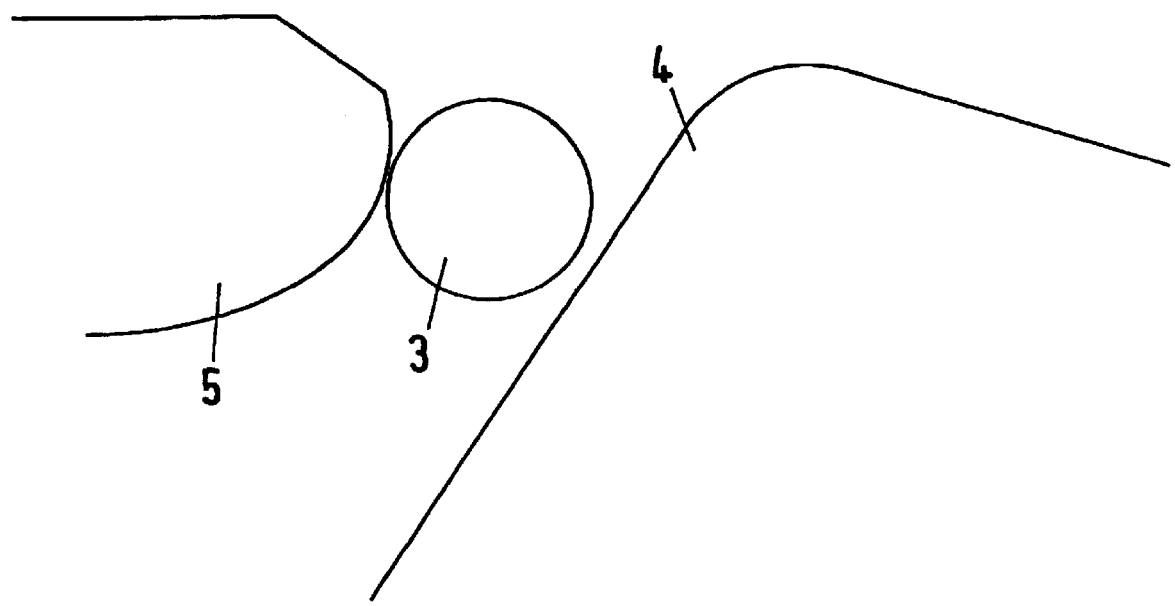
FIG. 5a schematically illustrates a side view of the cylindrical shape of an airbag according to the present invention.
Figure 5B:
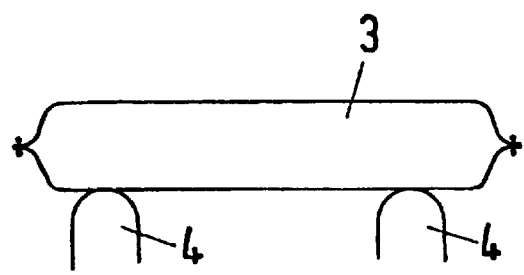
FIG. 5b schematically shows a top view of the cylindrical shape of an airbag according to the present invention.

FIGS. 5a and 5b schematically illustrate a cylindrical airbag 3 (inflated airbag 1 according to the present invention) coming into contact with the vehicle occupant's knees 4. After the gas generator (not illustrated) is activated, the airbag 3 emerges from a housing (not illustrated) arranged, for example, in the lower region of the instrument panel 5a. The cylindrical shape of the airbag 3 distributes stress substantially homogeneously so that high airbag internal pressures can be provided. Furthermore, the cylindrical shape of the airbag ensures that, even when a knee 4 of a vehicle occupant is in contact with the inflated airbag 3 in its edge region, a sufficient restraining force is supplied. Thus, by virtue of its cylindrical shape, the airbag 3 has essentially the same cross section in the edge region as in the intermediary region. When the knee 4 penetrates into the airbag 3, in the corresponding regions, a load is exerted on the airbag 3, thus further increasing the airbag internal pressure and thereby making it possible to absorb or dissipate the kinetic energy of the vehicle occupant.

The airbag according to the present invention can be formed by a simple and cost-effective construction. The airbag also provides a favorable stress distribution when it is deployed at a high internal pressure, and does not require its lateral ends to be fastened to the vehicle, as the present airbag becomes substantially cylindrical when it is deployed. As a result, the airbag can be used in a substantially more versatile and flexible way. At the same time, by means of the essentially cylindrical blank of the airbag, a simply constructed airbag with a symmetrical shape is formed, which has an essentially uniform stress distribution. In this case, high internal pressures can be provided in the airbag owing to the symmetrical stress distribution, so that high restraining forces can be achieved even when the occupant's knee impacts against a small region of the airbag. Thus, because of the high internal pressure, the inertia forces of the vehicle occupant who is displaced forward can be slowed over a relatively short distance. Moreover, because of the continuously substantially constant cross section of the airbag in its cylindrical main region, a good restraining action is provided along the entire airbag region, in contrast to cushion-shaped airbags.

Moreover, the airbag according to the invention can have relatively small lateral regions along the direction of the longitudinal axis of the inflated airbag. Due to the small longitudinal extent of the lateral region, the airbag can be configured to maximize the cylindrical extent. In other words, the transition between the cylindrical region and the lateral ends of the airbag is short. This ensures that the airbag has a constant cross section as far as possible up to its lateral edge, so that even a body part (knee) coming into contact with the airbag in this edge region is restrained reliably. Accordingly, catching straps, load distributors, or other additional measures are not necessary according to the airbag of the present invention.

The disclosure of the priority application, DE 100 39 555.4 filed Aug. 7, 2000, in its entirety, including the drawings, claims, and the specification thereof, is incorporated herein by reference.

We claim:

1. An airbag comprising:
   a tube folded longitudinally in a predetermined fold pattern having a plurality of individual looped segments and a pair of lateral seams that close each lateral end of the tube and maintain the fold pattern,
   additional fabric portions inserted at the lateral ends of the airbag between or into the individual segments, and secured by the lateral seams;
   wherein the airbag becomes substantially cylindrical upon inflation.

2. An airbag according to claim 1, wherein the tube comprises a rectangular fabric layer with a longitudinal seam that joins longitudinal ends thereof.

3. An airbag according to claim 1, wherein the predetermined fold pattern has at least four individually looped segments grouped into two sections having at least two adjacent segments laid one upon another, with the lateral seams maintaining the grouping.

4. An airbag according to claim 3, wherein the segments overlap one another at least partially in a middle region from which the segments extend outwardly, the overlapping segments being arranged one above the other in the middle region.

5. An airbag according to claim 1, wherein the additional fabric portions are integrally formed with the tube.

6. An airbag according to claim 1, wherein the additional fabric portions comprise double-folded cloth strips.

7. An airbag according to claim 2, wherein the longitudinal and lateral seams are stitches.

8. An airbag according to claim 2, wherein a region of the folded tube where the longitudinal seam is formed has a substantially constant thickness.

9. The airbag of claim 1, wherein the additional fabric portions are located in regions of the folded tube having a reduced number of layers arranged one above the other to compensate for varying thicknesses caused by different number of layers.

10. A method of forming an airbag, comprising the steps of:
    providing a tube;
    folding the tube longitudinally to form a fold pattern having a plurality of individual segments;
    closing each lateral end of the tube with a lateral seam, which also maintains the fold pattern,
    inserting additional fabric portions at the lateral ends of the airbag between or into the individual segments, and securing the fabric portions with the lateral seams;
    wherein the airbag becomes substantially cylindrical when inflated.

11. A method according to claim 10, wherein the cylindrical tube is formed by joining together longitudinal ends of a rectangular fabric layer with a seam.

12. A method according to claim 11, wherein the rectangular fabric layer is folded in half to align the longitudinal ends.

13. A method according to claim 10, wherein the fold pattern formed in the folding step includes at least four individually looped segments and wherein the folding step further comprises grouping the segments into two sections by situating at least two adjacent segments one next to another.

14. A method according to claim 13, wherein the folding step includes overlapping the segments at least partially in a middle region from which the segments extend outwardly, with the overlapping segments arranged one above the other in the middle region.

15. A method according to claim 10, wherein the additional fabric portions are integrally formed with the tube.

16. A method according to claim 10, wherein the additional fabric portions comprise double-folded cloth strips pushed from the side between or into the segments before forming the lateral seams.

17. A method according to claim 10, wherein the additional fabric portions are inserted into regions of the folded tube having a reduced number of layers arranged one above the other to compensate for varying thicknesses caused by different number of layers.

* * * * *